(12) United States Patent
Kifuku et al.

(10) Patent No.: US 7,176,651 B2
(45) Date of Patent: Feb. 13, 2007

(54) FAULT DETECTION SYSTEM FOR INVERTER

(75) Inventors: Takayuki Kifuku, Tokyo (JP); Masaki Matsushita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 79 days.

(21) Appl. No.: 11/044,297

(22) Filed: Jan. 28, 2005

(65) Prior Publication Data

US 2006/0056206 A1   Mar. 16, 2006

(30) Foreign Application Priority Data

Sep. 10, 2004   (JP) .............................. 2004-263542

(51) Int. Cl.
*H02P 7/00*   (2006.01)
(52) U.S. Cl. ........................ 318/801; 318/811; 363/56; 363/98
(58) Field of Classification Search ................ 318/801, 318/811, 722, 276, 798–815; 363/16, 20, 363/26, 40, 41, 132, 98
See application file for complete search history.

(56) References Cited

U.S. PATENT DOCUMENTS 4,832,133 A * 5/1989 Boys .............................. 173/1
5,650,708 A * 7/1997 Sawada et al. .............. 318/801
6,335,600 B1 * 1/2002 Kasai et al. ................. 318/434

FOREIGN PATENT DOCUMENTS

| JP | 04-087553 A | 3/1992 |
| JP | 04-091661 A | 3/1992 |
| JP | 2002-345283 A | 11/2002 |
| JP | 2003-237597 A | 8/2003 |

* cited by examiner

*Primary Examiner*—Rajnikant B. Patel
(74) *Attorney, Agent, or Firm*—Sughrue Mion, PLLC

(57) ABSTRACT

An inverter fault detection system of the present invention is provided with: bus voltage monitor means for monitoring the bus voltage of a three-phase inverter; output voltage monitor means for summing the phase output voltages coming from the three-phase PWM inverter, and for outputting the resulting summed output voltage through a filter having a low-pass characteristic of passing through only the cutoff frequency lower than the PWM carrier frequency; and fault determination means for determining that the three-phase PWM inverter is in the faulty state when the output voltage coming from the output voltage monitor means is almost the same as the voltage value corresponding to 3/2 times of the bus voltage monitored by the bus voltage monitor means.

18 Claims, 2 Drawing Sheets

FAULT DETECTION SYSTEM FOR INVERTER

BACKGROUND OF THE INVENTION

1. Field of the Invention

The present invention relates to a fault detection system for detecting faults occurring in an inverter, e.g., three-phase PWM inverter.

2. Description of the Related Art

An exemplary conventional fault detection system used for a three-phase power converter (three-phase inverter) is found in Japanese Patent No. 2902455 (Publication No: JP-A-4-87553). The fault detection system is provided with a detector, a sample hold circuit, a multiplexer, an A/D converter, and a micro processor. Specifically, the detector is provided to detect three-phase voltage and current relating to the three-phase power converter, and analog signals of the three-phase voltage and current detected by the detector are sample-hold by the sample hold circuit. The analog signals of the three-phase voltage and current are also output from the multiplexer responsively to the sequential selection made on a signal basis. Thus selected analog signals are sequentially forwarded to the A/D converter to be converted therein into digital values for output. The microprocessor reads in the digital values as a result of A/D conversion in the A/D converter, and uses the values for control operation. The voltage values and the current values read in by the microprocessor are each summed on a phase basis. When the resulting values fall in a certain range with a center value of 0, the fault detection system detects it as normal. If the resulting values do not fit in the range, it is detected as abnormal.

As such, in the conventional fault detection system for a three-phase inverter as found in the above patent document, fault determination is made by subjecting instantaneous values of the three phase voltage and current to A/D conversion through the sample hold circuit, and by detecting whether the sum of the A/D-converted values is in the vicinity of 0. This is applicable to the instantaneous values of three phase currents.

The problem here is that, due to the above-described structure, such a conventional fault detection system for a three-phase inverter requires a high-speed A/D converter to monitor instantaneous values of an inverter output voltage having a rectangular waveform.

What is more, with a three-phase inverter low in bus voltage for in-car use, to have a higher usage rate for the bus voltage, the three-phase inverter may be controlled to derive sinusoidal line voltage, i.e., inter-phase voltage.

If this is the case, the sum value of the phase voltages does not become 0, and thus no fault detection is available for the three-phase inverter.

Herein, the bus voltage is a direct current voltage to be applied to the three-phase inverter for conversion into an alternating voltage. Here, with a three-phase inverter for in-car use, the bus voltage is a battery voltage.

SUMMARY OF THE INVENTION

The present invention is proposed to solve the above problems, and a first object thereof is to provide an inverter fault detection system not requiring a high-speed A/D converter, and being capable of deriving a higher usage rate for a bus voltage.

A second object thereof is to provide an inverter fault detection system not requiring a high-speed A/D converter, being capable of deriving a higher usage rate for a bus voltage, and being capable of constant fault determination both in first and second drive modes, i.e., a first drive mode of deriving sinusoidal phase output voltages, and a second drive mode of deriving sinusoidal output line voltages.

A first aspect of the present invention is directed to an inverter fault detection system, including: bus voltage monitor means for monitoring a bus voltage of a three-phase PWM inverter; output voltage monitor means for summing phase output voltages coming from the three-phase PWM inverter, and for outputting an output voltage as a sum result through a filter having a low-pass characteristic of passing through only a cutoff frequency lower than a PWM carrier frequency; and fault determination means for determining that the three-phase PWM inverter is in a faulty state when the output voltage coming from the output voltage monitor means is not in the vicinity of a voltage value corresponding to 3/2 times of the bus voltage monitored by the bus voltage monitor means.

Moreover, a second aspect of the present invention is directed to an inverter fault detection system, including: output voltage monitor means for monitoring phase output voltages of a three-phase PWM inverter, and for outputting the phase output voltages through a filter having a low-pass characteristic of passing through only a cutoff frequency lower than a PWM carrier frequency; line voltage sum means for deriving, for summing, inter-phase line voltages based on the phase output voltages coming from the output voltage monitor means; and fault determination means for determining that the three-phase PWM inverter is in a faulty state when a value as a sum result derived from the inter-phase line voltages provided by the line voltage sum means is not in the vicinity of 0.

According to the inverter fault detection system of the first aspect, there is no more need for a high-speed A/D converter.

Moreover, according to the inverter fault detection system of the second aspect, no high-speed A/D converter is required, a higher usage rate can be derived for a bus voltage, and constant fault determination is possible both in first and second drive modes, i.e., a first drive mode of deriving sinusoidal phase output voltages, and a second drive mode of deriving sinusoidal output line voltages.

The foregoing and other objects, features, aspects, and advantages of the present invention will become more apparent from the following detailed description of the present invention when taken in conjunction with the accompanying drawings.

DETAILED DESCRIPTION OF THE INVENTION

Figure 1:
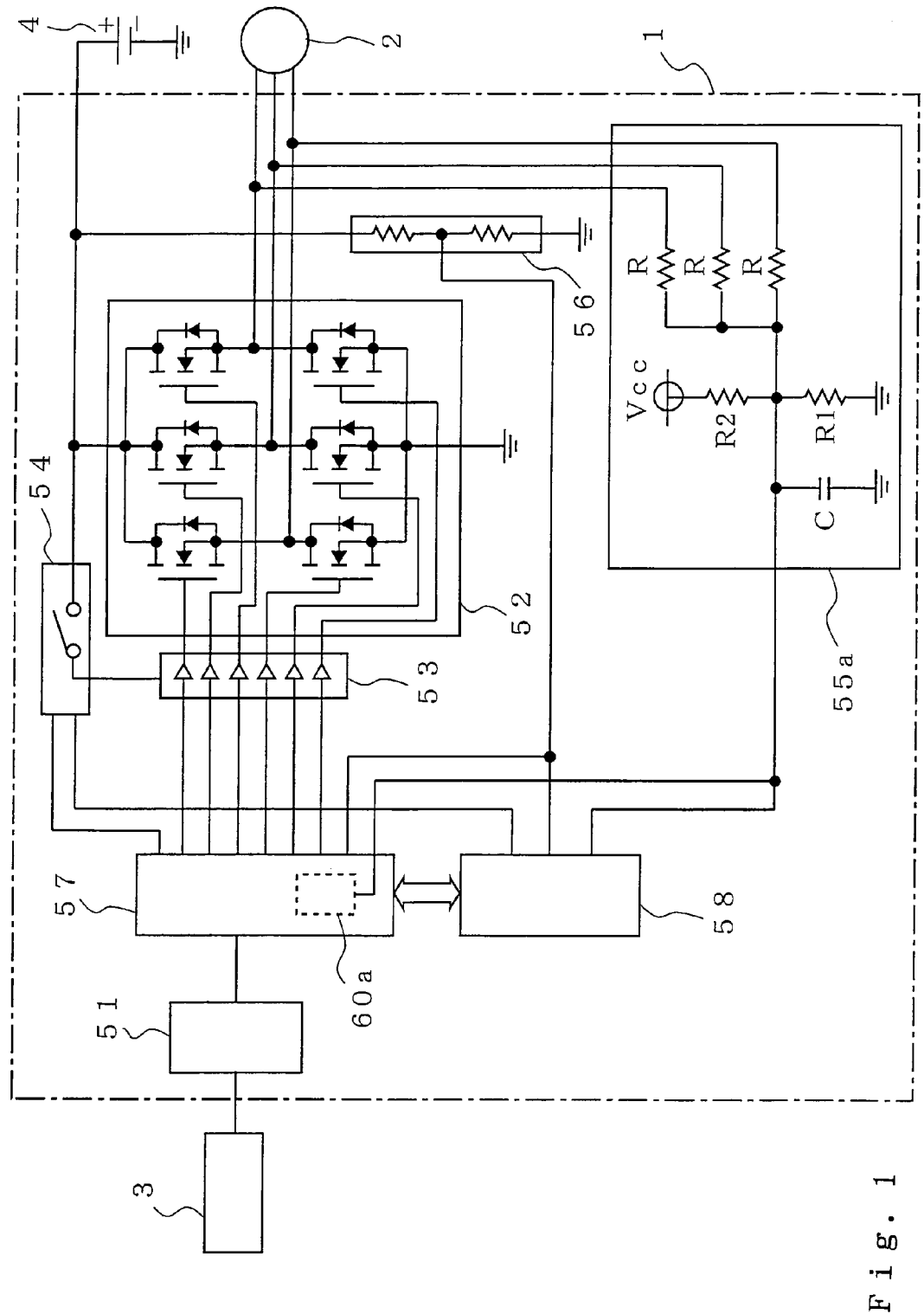
FIG. 1 is a block diagram showing an exemplary structure of an inverter fault detection system of a first embodiment when it is applied to a motor controller.

In the below, by referring to the accompanying drawings, embodiments of the present invention are described.

In the drawings, if components share the same reference numeral, it means that those components are the same or substantially the same.

First Embodiment.

In the below, a first embodiment of the present invention is described by referring to the accompanying drawings.

FIG. 1 is a block diagram showing an exemplary structure of an inverter fault detection system of a first embodiment when it is applied to a motor controller.

In the drawing, a reference numeral 1 denotes a controller, and 2 denotes a motor for in-car use (three-phase motor). In this embodiment, used for the motor 2 is a DC brushless motor.

A reference numeral 3 denotes a rotor angle sensor for detecting a rotor angle of the motor 2 for phase excitation in accordance with the magnetic pole of the motor 2. A reference numeral 4 denotes a battery.

A reference numeral 51 denotes an input interface for forwarding, to the controller 1, a rotor angle signal detected by the rotor angle sensor 3. A reference numeral 52 denotes a three-phase PWM (Pulse Width Modulation) inverter provided for driving the motor 2, and 53 denotes a gate drive circuit for driving the three-phase PWM inverter 52. A reference numeral 54 denotes switch means for cutting off the current going to the gate drive circuit 53.

Moreover, a reference numeral 55a denotes an output voltage monitor circuit for monitoring the output voltage of the three-phase PWM inverter 52, and 56 denotes a bus voltage monitor circuit for monitoring the bus voltage (in FIG. 1 example, battery voltage of the battery 4). A reference numeral 57 denotes a first microcontroller (first control section) for exercising control over the three-phase PWM inverter 52, and 58 denotes a second microcontroller (second control section) for detecting the operation of an electrically-powered steering system or others including the first microcontroller (first control section) 57.

A reference numeral 60a denotes fault determination means for making a determination whether the three-phase PWM inverter 52 is in the faulty state or not based on the output voltage coming from the output voltage monitor circuit 55a. Such a fault determination means 60a is placed in the first microcontroller (first control section) 57.

Described next is the operation of the inverter fault detection system of the first embodiment.

The first microcontroller (referred also to as first control section) 57 uses a rotor angle signal to be detected by the rotor angle sensor 3 as a basis to perform conversion. Herein, the conversion is applied using the three-phase PWM inverter 52 to a direct voltage coming from the battery 4, i.e., bus voltage, and derived thereby is a three-phase alternating voltage.

The resulting three-phase alternating voltage is then used as a basis to drive the motor 2. For the purpose, the first microcontroller (first control section) 57 exercises control over the output voltage of the three-phase PWM inverter 52 through the gate drive circuit 53. Such a control is referred to as first drive mode.

Note here that the three-phase alternating voltage coming from the three-phase PWM inverter 52 has been subjected to PWM (Pulse Width Modulation), and thus the output voltage corresponding to each phase has a rectangular waveform.

Assuming here that the battery 4 has the voltage value of $V_B$, the maximum line voltage will be $3^{1/2} \cdot V_B/2$ when each phase voltage is a sine wave voltage, and thus the usage rate is poor for the power supply voltage, i.e., voltage value $V_B$ of the battery 4.

As a well-known method, the usage rate is increased for the power supply voltage while a third-order harmonic is superimposed on each phase voltage, and the line voltage is kept sinusoidal.

When the motor 2 is under loaded conditions and faster in rotation speed, the impressed voltage is often not high enough.

In view thereof, in this example, such a drive method, i.e., the method of increasing the usage rate for the power supply voltage while superimposing a third-order harmonic on each phase voltage and keeping the line voltage sinusoidal, is applied to drive the three-phase PWM inverter 52 when the motor 2 is rotating at a predetermined speed or faster. Such a method application is made based on a rotor angle signal coming from the rotor angle sensor 3, and referred to as second drive mode.

Here, the output of the three-phase PWM inverter 52 is the three-phase alternating voltage, and the result of voltage sum derives the neutral voltage of the three-phase PWM inverter 52.

Accordingly, in the first drive mode, zero detection is made with respect to the sum value of the phase voltages, i.e., neutral voltage, and thereby, fault detection can be made whether the three-phase PWM inverter 52 is in the faulty state, e.g., due to a ground fault.

The output voltage monitor circuit 55a is provided to make such detection, and in addition to sum the phase voltages of the three-phase PWM inverter 52, operates to remove PWM carrier components to derive a value corresponding to the neutral voltage when the three-phase PWM inverter 52 is normally working.

In more detail, the output voltage monitor circuit 55a sums the phase output voltages of the three-phase PWM inverter 52, and outputs the resulting summed phase output voltages through a filter having a low-pass characteristic of passing through only the cutoff frequency lower than the PWM carrier frequency. The filter is structured by R1, R2, and C1.

Assuming here that the phase output voltages are $V_1$, $V_2$, and $V_3$, and the output voltage coming from the output voltage monitor circuit 55a is $V_0$, the equation is derived as follows:

$$V_0 = R'Vcc + R''(V_1+V_2+V_3)/(1+\tau s) \quad (1),$$

where s denotes a Laplace operator,
Vcc denotes a predetermined constant voltage, $$R' = \{R1//(R/3)\}/[R2+\{R1//(R/3)\}],$$

$$R'' = \{R1//R2//(R/2)\}/[R+\{R1//R2//(R/2)\}],$$

and $$\tau = C \cdot R \cdot R''.$$

The setting of $\tau$ is so made as to be sufficiently long compared with the PWM carrier cycle, and to allow the ground fault detection negligible even if delayed.

For example, with the PWM carrier cycle of 50 μs, $\tau$ may be so set as to be about 1 ms.

As described in the foregoing, in the first drive mode, with an assumption that the bus voltage (battery voltage) is $V_B$ and the PWM carrier removal has been completed, in the above equation (1), $V_1+V_2+V_3=3V_B/2$, and $V_0=R'Vcc+3R''V_B/2$.

That is, "$V_0=R'Vcc+3R''V_B/2$ is the output voltage value of the output voltage monitor circuit (output voltage monitor means) 55a, and the value corresponds to 3/2 times of the bus voltage $V_B$.

The fault determination means 60a in the first microcontroller (first control section) 57 accordingly makes fault determination through verification of the output voltage $V_O$ coming from the output voltage monitor circuit (output voltage monitor means) 55a. More in detail, the verification is made to see whether the output voltage $V_O$ is in a given range based on the bus voltage $V_B$ to be detected by the bus voltage monitor circuit 56 in a case where the motor 2 is rotating at a lower speed, and in a case where the three-phase PWM inverter 52 is driven in the first drive mode.

To be more specific, the fault determination means 60a determines that the three-phase PWM inverter 52 is in the faulty state when the output voltage $V_O$ coming from the output voltage monitor circuit 55a is not in the vicinity of the voltage value corresponding to 3/2 times of the bus voltage $V_B$, which is monitored by the bus voltage monitor circuit 56, i.e., R'Vcc +3R"$V_B$/2.

As described in the foregoing, in the inverter fault detection system of the present embodiment, the first microcontroller (first control section) 57 carries the following components. That is, the bus voltage monitor circuit (bus voltage monitor means) 56 for monitoring the bus voltage of the three-phase PWM inverter 52; the output voltage monitor circuit (output voltage monitor means) 55a for summing the phase output voltages coming from the three-phase PWM inverter 52, and for outputting the resulting summed output voltage through a filter having a low-pass characteristic of passing through only the cutoff frequency lower than the PWM carrier frequency; and the fault determination means 60a for determining that the three-phase PWM inverter 52 is in the faulty state when the output voltage coming from the output voltage monitor circuit (output voltage monitor means) 55a is not in the vicinity of the voltage value corresponding to 3/2 times of the bus voltage monitored by the bus voltage monitor circuit 56.

With such a structure, according to the inverter fault detection system of the present embodiment, there is no more need for a conventionally-used high-speed A/D converter, i.e., high-speed A/D converter used for detecting instantaneous values of the inverter output voltage having a rectangular waveform. What is better, the usage rate can be increased for the bus voltage.

Once the fault determination means 60a determines that the three-phase PWM inverter 52 is in the faulty state, the first microcontroller (first control section) 57 instructs the gate drive circuit 53 to cut off the current supply from the three-phase PWM inverter 52 to the motor 2.

This can help detect a ground fault occurring to the three-phase PWM inverter 52 surely during or prior to driving of the motor 2, thereby successfully preventing the motor 2 from being burnt, for example.

What is more, the power supply to the gate drive circuit 53 is cut off by disengaging the contact point with the switch means 54, whereby the motor 2 is favorably protected from a current anomaly when the gate drive circuit 53 is in the faulty state.

Note here that described above is a case where the fault detection means 60a is provided in the first microcontroller (first control section) 57. Alternatively, the fault detection means 60a may be provided in the second microcontroller (second control section) 58 to allow the microcontroller (second control section) 58 also to make fault determination of the three-phase PWM inverter 52.

When the three-phase PWM inverter 52 is determined as being in the faulty state, the power supply to the gate drive circuit 53 is cut off by disengaging the contact point with the switch means 54 so that the three-phase PWM inverter 52 is prohibited to produce outputs.

With such a structure, the motor 2 can be protected from a current anomaly caused by the running-away first microcontroller (first control section) 57.

In the present embodiment, the three-phase PWM inverter 52 is exemplarily switched between two drive modes. This is not surely restrictive, and alternatively, the first drive mode may be surely continually applied to perform constant fault monitoring in the mode.

Further, the power supply to the gate drive circuit 53 is cut off in the present embodiment. In an alternative manner, another switch means may be provided between the motor drive circuit, i.e., three-phase PWM inverter 52, and the battery 4 to cut off the battery voltage application.

With such a structure, the motor 2 can be protected from a current anomaly caused by the faulty motor drive circuit (three-phase PWM inverter 52).

Still further, the filter, i.e., low-pass filter of the output voltage monitor circuit 55a is not restrictive to have the primary low-pass characteristics, and the secondary low-pass characteristics will do.

If this is the case, the PWM carrier components can be removed in a more rapid manner, achieving delay prevention for ground fault detection.

Still further, in the above, the bus voltage is used as a basis for setting of a determination threshold value. This is not restrictive, and when the battery voltage 4 is determined as being constant, such a faulty determination threshold value may be fixed to a certain value.

Still further, in the above, the PWM carrier components are removed utilizing the primary low-pass characteristics. Alternatively, the PWM carrier components may be removed by sampling the output from the output voltage monitor circuit 55a in synchronous with a PWM carrier.

Still further, in the above, the first drive mode is applied when the motor 2 is rotating at a slower speed, and the second drive mode is applied with the faster rotation speed. This is not restrictive, and the first drive mode may be applied when the phase voltage to be forwarded to the three-phase PWM inverter 52 has the amplitude of a predetermined value or smaller, and the second drive mode may be applied when such an amplitude is a predetermined value or larger to increase the usage rate of the power supply voltage.

Still alternatively, the first drive mode may be applied when the line voltage has an amplitude of a predetermined value or smaller, and the second drive mode may be applied when such an amplitude is a predetermined value or larger.

Still alternatively, with phase current detection means provided, the first drive mode may be applied when the detected phase current has the amplitude of a predetermined value or smaller, and the second drive mode may be applied when such an amplitude is a predetermined value or larger to increase the usage rate of the power supply voltage.

Surely, to exercise current feedback control, the first drive mode may be applied when the phase current has the target amplitude of a predetermined value or smaller, or when the target current on a d q axis (two-axis DC coordinates axis) is a predetermined value or smaller, and the second drive mode may be applied with the predetermined value or larger.

Still alternatively, the first drive mode may be applied when the bus voltage is a predetermined value or larger, and the second drive mode may be applied with the predetermined value or smaller to increase the usage rate for the power supply voltage.

Second Embodiment.

In the above-described first embodiment, the sum value of the phase voltages is used as a basis to determine whether the three-phase PWM inverter is in the faulty state. Alternatively, the line voltage may be used as a basis for such fault determination.

This effectively enables constant fault determination for the three-phase PWM inverter in either drive mode of the first embodiment, i.e., the first and second drive modes.

Figure 2:
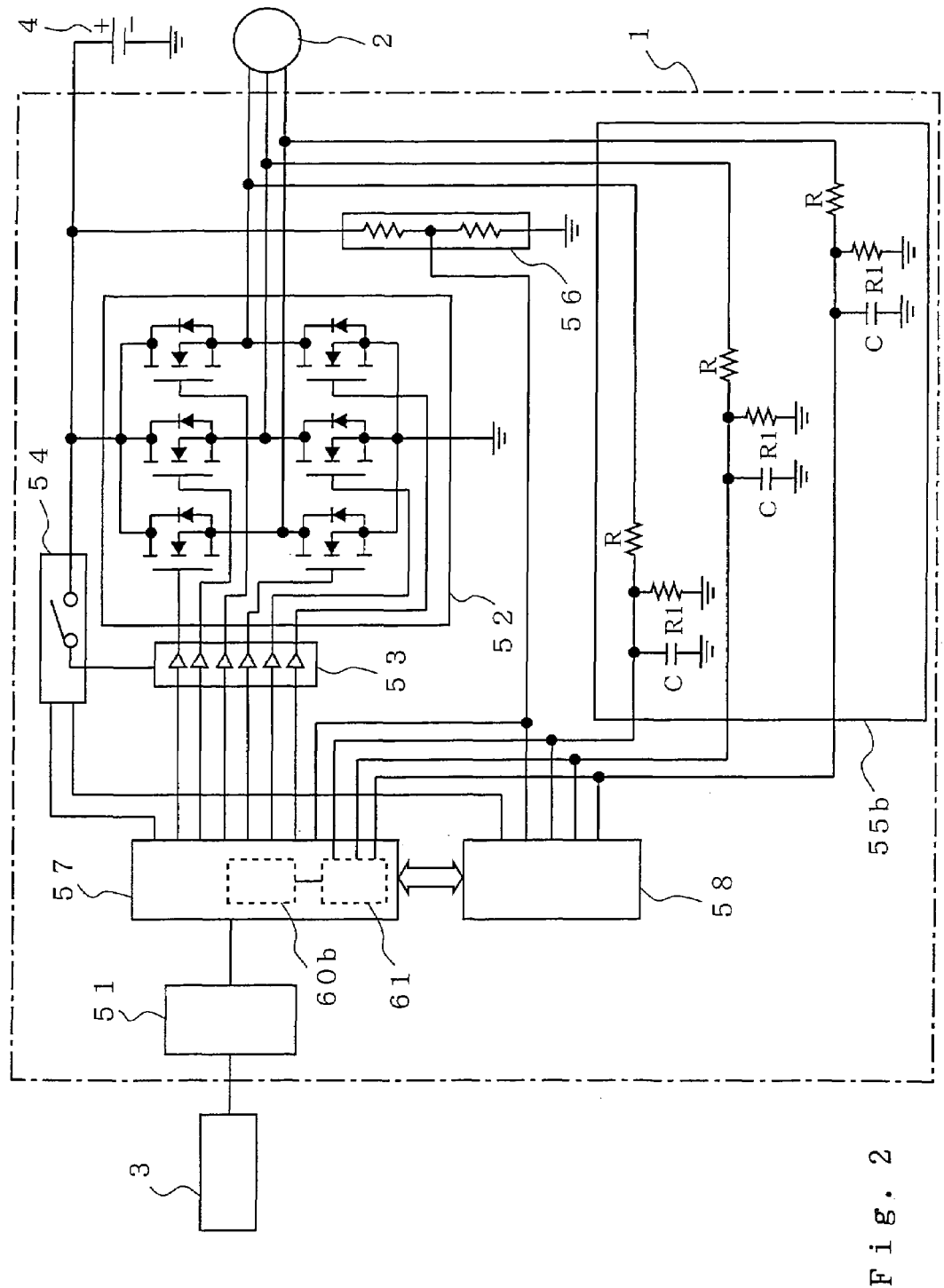
FIG. 2 is a block diagram showing an exemplary structure of an inverter fault detection system of a second embodiment when it is applied to a motor controller.

FIG. 2 is a block diagram showing an exemplary structure of an inverter fault detection system of a second embodiment when it is applied to a motor controller for in-car use.

In the drawing, a reference numeral 55b denotes an output voltage monitor circuit (output voltage monitor means), 60b denotes fault determination means, and 61 denotes line voltage sum means.

Note that, in the drawing, if components share the same reference numeral as those in FIG. 1, it means that those are the same or substantially operating the same as those in FIG. 1, and thus no further description is given again.

The output voltage monitor circuit (output voltage monitor means) 55b monitors the phase output voltages of the three-phase PWM inverter 52, and outputs the phase output voltages through a filter having a low-pass characteristic of passing through only the cutoff frequency lower than the PWM carrier frequency. The filter is structured by R, R1, and C1.

Assuming that the U-phase output voltage coming from the three-phase PWM inverter 52 is Vu, and the U-phase voltage output of the output voltage monitor circuit (output voltage monitor means) 55b is Vou, the equation is derived as follows:

$$Vou = VuR'/(1+\tau s),$$

where $$R' = \{R1/(R+R1)\},$$

and $$\tau = R'C.$$

The setting of $\tau$ is so made as to be sufficiently long compared with the PWM carrier cycle, and to allow the ground fault detection negligible even if delayed. For example, with the PWM carrier cycle of 50 μs, $\tau$ may be so set as to be about 1 ms.

The line voltage sum means 61 uses the output voltage coming from the output voltage monitor circuit (output voltage monitor means) 55b as a basis to derive the line voltage for each phase, and the result is summed through calculation.

The fault determination means 60b determines that the three-phase PWM inverter 52 is in the fault state when the sum value derived by the line voltage sum means 61 as such is not 0.

The line voltage is always a three-phase alternating voltage, and the sum result of the line voltage is always 0. Accordingly, making fault determination based on such a line voltage enables constant fault detection for the three-phase PWM inverter 52.

Note here that described above is a case where the fault detection means 60b and the line voltage sum means 61 are both provided in the first microcontroller (first control section) 57. Alternatively, the fault detection means 60b and the line voltage sum means 61 may be provided in the second microcontroller (second control section) 58.

Still alternatively, the line voltage sum means 61 may be provided outside of the first microcontroller (first control section) 57 or the second microcontroller (second control section) 58.

As described in the foregoing, the inverter fault detection system of the present embodiment carries the following components. That is, the output voltage monitor circuit (output voltage monitor means) 55b for monitoring the phase output voltages of the three-phase PWM inverter 52, and for outputting the phase output voltages through a filter having a low-pass characteristic of passing through only the cutoff frequency lower than the PWM carrier frequency; the line voltage sum means 61 for deriving, for summing, the inter-phase line voltages based on the phase output voltages coming from the output voltage monitor circuit (output voltage monitor means) 55b; and the fault determination means 60b for determining that the three-phase PWM inverter 52 is in the faulty state when the summed value derived from the inter-phase line voltages provided by the line voltage sum means 61 is not in the vicinity of 0.

As such, according to the inverter fault detection system of the present embodiment, there is no more need for a high-speed A/D converter, and the usage rate can be increased for the bus voltage. Moreover, constant fault determination becomes possible both in first and second drive modes, i.e., a first drive mode of deriving sinusoidal output voltages, and a second drive mode of deriving sinusoidal output line voltages.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An inverter fault detection system, comprising:
   bus voltage monitor means for monitoring a bus voltage of a three-phase PWM inverter;
   output voltage monitor means for summing phase output voltages coming from the three-phase PWM inverter, and for outputting an output voltage as a sum result through a filter having a low-pass characteristic of passing through only a cutoff frequency lower than a PWM carrier frequency; and
   fault determination means for determining that the three-phase PWM inverter is in a faulty state when the output voltage coming from the output voltage monitor means is not in the vicinity of a voltage value corresponding to 3/2 times of the bus voltage monitored by the bus voltage monitor means.

2. An inverter fault determination system, comprising:
   output voltage monitor means for monitoring phase output voltages of a three-phase inverter, and for outputting the phase output voltages through a filter having a low-pass characteristic of passing through only a cutoff frequency lower than a PWM carrier frequency;
   line voltage sum means for deriving, for summing, inter-phase line voltages based on the phase output voltages coming from the output voltage monitor means; and
   fault determination means for determining that the three-phase PWM inverter is in a faulty state when a value as a sum result derived from the inter-phase line voltages provided by the line voltage sum means is not in the vicinity of 0.

3. The inverter fault detection system according to claim 1, further comprising:

a first control section for controlling an operation of the three-phase PWM inverter; and a second control section for monitoring the first control section, wherein the fault determination means is provided in the first control section.

4. The inverter fault detection system according to claim 2, further comprising:

a first control section for controlling an operation of the three-phase PWM inverter; and a second control section for monitoring the first control section, wherein the fault determination means is provided in the first control section.

5. The inverter fault detection system according to claim 1, further comprising:

a first control section for controlling an operation of the three-phase PWM inverter; and a second control section for monitoring the first control section, wherein the fault determination means is provided in the second control section.

6. The inverter fault detection system according to claim 2, further comprising:

a first control section for controlling an operation of the three-phase PWM inverter; and a second control section for monitoring the first control section, wherein the fault determination means is provided in the second control section.

7. The inverter fault detection system according to claim 1, wherein the three-phase PWM inverter operates in a first drive mode of deriving a sinusoidal output voltage for an phase output voltage, and a second drive mode of deriving a sinusoidal voltage for an output line voltage, and when the first drive mode is selected, the fault determination means performs fault determination.

8. The inverter fault detection system according to claim 2, wherein the three-phase PWM inverter operates in a first drive mode of deriving a sinusoidal output voltage for a phase output voltage, and a second drive mode of deriving a sinusoidal voltage for an output line voltage, and when the second drive mode is selected, the fault determination means performs fault determination.

9. The inverter fault detection system according to claim 7, wherein when a phase current is a predetermined value or lower, the first drive mode is selected.

10. The inverter fault detection system according to claim 8, wherein when a phase current is a predetermined value or smaller, the first drive mode is selected.

11. The inverter fault detection system according to claim 7, wherein when the phase output voltage has an amplitude of a predetermined value or smaller, the first drive mode is selected.

12. The inverter fault detection system according to claim 8, wherein when the phase output voltage has an amplitude of a predetermined value or smaller, the first drive mode is selected.

13. The inverter fault detection system according to claim 7, wherein when the output line voltage has an amplitude of a predetermined value or smaller, the first drive mode is selected.

14. The inverter fault detection system according to claim 8, wherein when the output line voltage has an amplitude of a predetermined value or smaller, the first drive mode is selected.

15. The inverter fault detection system according to claim 7, wherein the three-phase inverter uses a three-phase motor as a load, and when the three-phase motor rotates at a predetermined speed or slower, the first drive mode is selected.

16. The inverter fault detection system according to claim 8, wherein the three-phase inverter uses a three-phase motor as a load, and when the three-phase motor rotates at a predetermined speed or slower, the first drive mode is selected.

17. The inverter fault detection system according to claim 7, wherein when the bus voltage is a predetermined value or larger, the first drive mode is selected.

18. The inverter fault detection system according to claim 8, wherein when the bus voltage is a predetermined value or larger, the first drive mode is selected.

* * * * *